United States Patent [19]

Babirad et al.

[11] Patent Number: 5,087,672

[45] Date of Patent: Feb. 11, 1992

[54] FLUORINE-CONTAINING ACRYLATE AND METHACRYLATE SIDE-CHAIN LIQUID CRYSTAL MONOMERS AND POLYMERS

[75] Inventors: Stefan A. Babirad; Eugene P. Janulis; Nicholas A. Stacey; Cheryl L. S. Elsbernd, all of St. Paul, Minn.

[73] Assignee: Minnesota Mining and Manufacturing Company, St. Paul, Minn.

[21] Appl. No.: 537,912

[22] Filed: Jun. 13, 1990

[51] Int. Cl.$^5$ .................. C08F 20/02; C08F 20/06
[52] U.S. Cl. .................. 525/329.5; 525/199; 525/266; 525/326.2; 525/329.7; 525/330.3; 428/1; 252/299.1; 560/221
[58] Field of Search .................. 525/329.5, 326.2, 119, 525/266; 526/311, 312; 560/221

[56] References Cited

U.S. PATENT DOCUMENTS

| | | | |
|---|---|---|---|
| 4,631,328 | 12/1986 | Ringsdorf | 526/259 |
| 4,717,757 | 1/1988 | Dubois et al. | 526/246 |
| 4,720,355 | 1/1988 | DeMartino | 252/582 |
| 4,795,664 | 1/1989 | DeMartino | 428/1 |
| 4,796,976 | 1/1989 | Leslie et al. | 350/330 |
| 4,804,255 | 2/1989 | Choe | 350/354 |
| 4,808,332 | 2/1989 | DeMartino et al. | 526/312 |
| 4,818,807 | 4/1989 | Morita et al. | 528/191 |
| 4,822,865 | 4/1989 | DeMartino et al. | 526/292.2 |
| 4,853,448 | 8/1989 | Müller | 526/254 |

FOREIGN PATENT DOCUMENTS

| | | |
|---|---|---|
| 188785 | 7/1986 | European Pat. Off. |
| 231770 | 8/1987 | European Pat. Off. |
| 262680 | 4/1988 | European Pat. Off. |
| 271730 | 6/1988 | European Pat. Off. |
| 2722589 | 11/1978 | Fed. Rep. of Germany . |
| 2592055 | 6/1987 | France . |
| 2185487 | 7/1987 | United Kingdom . |

OTHER PUBLICATIONS

Nöel, C. et al., Makromol. Chem., Macromol. Symp. 24, 283-301 (1989).
Lorenz, R., Liquid Crystals, 1989, vol. 6, No. 6, 667-674.
Kitazume, T. et al., J. Am. Chem. Soc. 1990, 112, 6608-6615.
Suzuki, T. et al., Liquid Crystals, 1989, vol. 6, No. 2, 167-174.
J. D. Margerum and L. J. Miller in *J. Coll. Int. Sci.*, 58, (3), 559 (1977).
T. Kallard, "Liquid Crystals and Their Applications", Optosonic Press: NY, 1970, pp. 205-207.
T. Kallard, "Liquid Crystal Devices", Optosonic Press: NY, 1973, pp. xi-xv.
J. L. West, *Mol. Cryst. Liq. Cryst. Inc. Nonlin. Opt.*, 157, 427 (1988).
D. J. Williams, "Nonlinear Optical Properties of Organic and Polymeric Materials", Am. Chem. Soc.: Wash, DC 1983, pp. 109-133.
T.-S. Chung, *Polym. Eng. Sci.*, 26, (13), 901 (1986).
H. Finkelmann, *Crit. Rep. Appl. Chem.*, 22, 145 (1987).
C. Noel, *Makromol. Chem., Macromol. Symp.*, 22, 95 (1988).
C. McArdle, "Side-Chain Liquid Crystal Polymers", Chapman and Hall: NY, 1989, pp. 357-395.

*Primary Examiner*—Joseph L. Schofer
*Assistant Examiner*—Fred Zitomer
*Attorney, Agent, or Firm*—Gary L. Griswold; Walter N. Kirn; Lorraine R. Sherman

[57] ABSTRACT

The present invention relates to novel fluorinated acrylate and methacrylate ester monomers and homopolymers and copolymers thereof. In another aspect, it relates to a process for preparing monomers of the invention. Homopolymers and copolymers of the invention have units which correspond to the following general chemical formula:

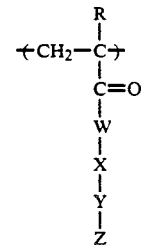

wherein
R is hydrogen, halo, a $C_1$ to $C_4$ alkyl or haloalkyl group, or a $C_6$ to $C_{10}$ aryl group,
W is —O— or —$NR^1$—, wherein $R^1$ is hydrogen or a $C_1$ to $C_4$ alkyl group,
X is a carbon-to-carbon single bond or a spacer group,
Y is a mesogenic group, and
Z is a fluorinated alkyl group.
The novel monomers and polymers can be liquid crystals.

20 Claims, No Drawings

FLUORINE-CONTAINING ACRYLATE AND METHACRYLATE SIDE-CHAIN LIQUID CRYSTAL MONOMERS AND POLYMERS

BACKGROUND OF THE INVENTION

1. Field Of The Invention

This invention relates to novel fluorinated acrylate and methacrylate esters and homopolymers and copolymers thereof. In another aspect, it relates to a process for preparing monomers and polymers of the invention. The polymers and copolymers favor smectic mesophases due to the fluorine content of the compounds. Polymers and copolymers of the invention are useful for preparing optical data storage media, passive and active guide media, imaging media, display media, and the like.

2. Description Of Background Art

Low molecular weight liquid crystalline (LC) materials have found numerous applications in the technology area of electro-optics. Low molecular weight LC materials are attractive in display applications such as wrist watches, message boards, flat panel televisions, realtime optical data processing, waveguide switches, and the like. These and other applications are further described by J. D. Margerum and L. J. Miller in *J. Coll. Int. Sci.*, 58(3), 559 (1977). Liquid crystalline materials exhibit desirable anisotropic properties such as low birefringence, dielectric anisotropy and conductive anisotropy which permit the electro-optic applications to be feasible. Additional information concerning low molecular weight liquid crystalline materials for electro-optical applications and devices may be found in the books edited by T. Kallard, "Liquid Crystals and Their Applications", Optosonic Press: New York, 1970, pp. 205–207; and "Liquid Crystal Devices", Optosonic Press: New York, 1973, pp. xi–xv.

Polymeric materials are known to have the advantage over nonpolymeric materials in that they can be processed and molded into desirable articles. Liquid crystalline guest-host materials incorporate both the processability of the polymer (host) with the electro-optical properties of the low molecular weight LC (guest). Guest-host materials are aligned in an electric field and the process is described in depth by J. L. West, *Mol. Cryst. Liq. Cryst. Inc. Nonlin. Opt.*, 157, 427 (1988) and also in the book edited by D. J. Williams, "Nonlinear Optical Properties of Organic and Polymeric Materials", American Chemical Society: Washington, D.C., 1983, pp. 109–133.

An alternative approach for incorporation of liquid crystalline materials into a polymer is to covalently attach the liquid crystalline mesogenic group to the polymeric backbone.

In general, there are two types of liquid crystalline polymers known in the art. They are main-chain liquid crystalline polymers (MCLCPs), where the mesogenic groups form the backbone of the molecular chains, and side-chain liquid crystalline polymers (SCLCPs), where the mesogenic groups are pendant to a polymer backbone, linked via a spacer group.

Recent developments in the technology of thermotropic liquid crystalline polymers may be found in review articles by (1) T-S Chung, *Polym. Eng. Sci.*, 26(13), 901 (1986), (2) H. Finkelmann, *Crit. Rep. Appl. Chem.*, 22, 145 (1987), and (3) C. Noel, *Makromol. Chem., Macromol. Symp.*, 22, 95 (1988). A thorough discussion of many facets of liquid crystalline polymers is also contained in the book edited by C. B. McArdle, "Side-Chain Liquid Crystal Polymers", Chapman and Hall: New York, 1989, pp. 357–394.

Synthesis of side-chain liquid crystalline polymers containing hydrocarbon functionalities has been described in (a) U.S. Pat. Nos. 4,631,328; 4,720,355; 4,795,664; 4,796,976; 4,804,255; and 4,818,807; (b) Eur. Pat. Appls. 188,785; 231,770; 262,680; and 271,730; (c) U.K. Pat. Appl. 2,185,487; and (d) DE 2,722,589. The art discloses that side-chain liquid crystalline polymers have unique properties that are suited for optical usage. U.S. Pat. No. 4,631,328 describes polymers that contain mesogenic groups and dye radicals in the side-chains. Polymers derived therefrom can be used together with low molecular weight liquid crystals or liquid crystal mixtures, in electrooptical displays. Incorporation of a highly polar functional group onto the liquid crystalline mesogenic group has yielded side-chain liquid crystalline polymers that exhibit nonlinear optical responses. Eur. Pat. Application Nos. 231,770 and 262,680 describe methacrylate homopolymers containing a p-nitrobiphenyl mesogenic group which is decoupled from the polymeric backbone via a hexyloxy spacer group. These materials have been filled in poling cells and oriented through an externally applied electric field to give a transparent waveguide device. To increase the nonlinear optical response, Eur. Pat. Application No. 271,730 discloses incorporation of stilbene groups to give the material a large delocalized conjugated pi-electron system.

Incorporation of fluorine atoms into side-chain liquid crystalline polymers has been described in U.S. Pat. Nos. 4,717,757; 4,808,332; and 4,822,865. U.S. Pat. No. 4,717,757 describes the reaction of 4-cyano-3-fluorophenol with 4-(acryloyloxyalkoxy)benzoyl chloride to yield a high dielectric material suitable for display devices. U.S. Pat. Nos. 4,808,332 and 4,822,865 disclose nonlinear optical materials that have incorporated fluorine atoms into the polymer backbone. These materials display nonlinear optical responses and find applications in optical light switches and light modulator devices.

Acrylic monomers containing a telemeric fluorine tail group are described in FR Demande de Brevet 2,592,055. However, there is no mention or suggestion for producing liquid crystalline polymers that contain a rigid mesogenic group that contains a pendant fluorinated alkyl group, which is one of the embodiments of this invention.

SUMMARY OF THE INVENTION

Briefly, the present invention provides novel polymerizable side-chain liquid crystalline monomers which are characterized by Formula I:

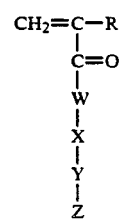

wherein

R can be hydrogen, halo, a $C_1$–$C_4$ alkyl, $C_6$–$C_{10}$ aryl, or $C_1$ to $C_4$ haloalkyl group having at least one F, Cl, or Br atom;

W can be —O— or —NR$^1$—

X can be a spacer group or a carbon-to-carbon single bond;

Y can be a mesogenic group;

Z can be a $C_1$ to $C_{12}$ fluorinated saturated aliphatic group (optionally comprising non-peroxidic oxygen atoms);

R$^1$ can be hydrogen, a $C_1$ to $C_4$ alkyl group, or a $C_5$ to $C_{12}$ aromatic group. Representative examples are methyl, ethyl, butyl, benzyl, and the like.

Representative spacer groups, X, are $C_2$-$C_{20}$ (preferably $C_2$-$C_{12}$) saturated aliphatic groups which can be linear or branched, and optionally can be interrupted by at least one non-peroxidic oxygen or sulfur atom. The branching groups may comprise $C_1$-$C_4$ alkyl groups; $C_1$-$C_4$ alkoxy groups; halo or haloalkyl groups; and hydroxyl groups. The spacer group may also comprise a $C_2$-$C_{20}$ (preferably $C_2$-$C_{12}$) saturated fluoroaliphatic group which may be linear or branched, and optionally can be interrupted by at least one non-peroxidic oxygen or sulfur atom. The branching groups may consist of $C_1$-$C_4$ alkyl groups; $C_1$-$C_4$ alkoxy groups; halo or haloalkyl groups; and hydroxyl groups.

Mesogenic group, Y, can arise from those mentioned by McArdle, infra, as well as those disclosed in U.S. Pat. No. 4,631,328, and both are incorporated herein by reference. Representative Y groups include para-linked (i.e., having valence bonds in para position on the ring(s)) aromatics such as phenyl benzoates, phenyl benzamides, biphenyls, phenyl Schiff bases, and the like.

Preferred mesogenic groups are those which are represented by the formulae:

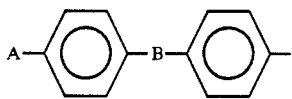

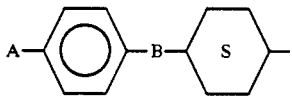

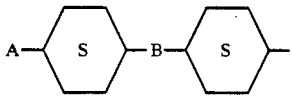

where
A can be —O—,

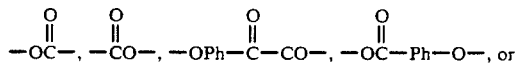

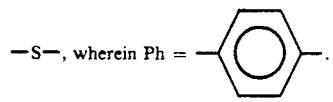

B can be a covalent bond or group having the formula

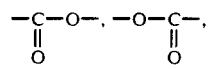

—CH=CH—, —N=N—, —N=CH—, —CH=N—, or —C≡C—.

More particularly, Z is a fluorinated alkoxy group. Fluorinated alkoxy or alkyl groups, Z, are those earlier disclosed in U.S. Pat. No. 4,886,619 and are incorporated herein by reference. Representative Z groups include 1,1-dihydroperfluoroalkoxy groups such as 1,1-dihydroperfluorobutoxy, 1,1-dihydroperfluorohexyloxy, and 1,1-dihydroperfluorooctyloxy groups.

In another aspect this invention provides novel homopolymers and copolymers derived from the novel side-chain liquid crystalline monomers that contain fluorinated alkoxy or alkyl groups.

In a preferred embodiment, liquid crystalline acrylate and methacrylate monomers that contain a fluorinated alkoxy or alkyl group are described. The monomers, by nature of the fluorinated group, show lower birefringence, increased hydrophobicity, and lower viscosity than do their hydrocarbon analogues. The monomers, when polymerized, find use in optical data storage media, passive and active guide media, imaging media, display media, and the like.

Preferred compounds of the invention are those wherein the fluorinated alkoxy or alkyl groups contain four carbon atoms, i.e. —OCH$_2$C$_3$F$_7$ and —CH$_2$C$_3$F$_7$.

In another aspect, this invention provides a process (disclosed below) to prepare novel side-chain liquid crystalline monomers and polymers that contain a fluorinated alkyl or a fluorinated alkoxy group. Alternative processes for obtaining precursors to the novel side-chain liquid crystalline monomers that contain fluorinated alkoxy or alkyl groups are disclosed.

In this application:

"liquid crystal monomer" means any polymerizable rodlike molecule that can undergo transformations into stable, intermediate semifluid state(s) before passing into the liquid state on heating or shows monotropic intermediate semifluid state(s) on cooling from the isotropic (liquid) state;

"liquid crystalline polymer" means a polymer that can undergo transformations into stable, intermediate semifluid state(s) before passing into the liquid state on heating or shows monotropic intermediate semifluid state(s) on cooling from the isotropic (liquid) state;

"monotropic" means a liquid crystal phase that is seen only on cooling from the isotropic (liquid) state;

"side-chain" means a pendent group, i.e. a group in the monomer which, upon polymerization of the monomer, is not located in the polymer backbone;

"mesogen" means any moiety which permits a molecule to attain a liquid crystalline phase;

"spacer group" means any moiety which partially decouples the mobility of the main chain polymer from that of the mesogenic group;

"halo" means halogen, i.e., Cl, F, Br, I;

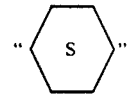

means a saturated ring structure;

"acrylamide" and "acrylate" are used in a generic sense and mean not only derivates of acrylic acid, but also methacrylic and other modified acrylic acids including both the so-called acryloyl, i.e., 2-propenoyl, and methacryloyl, i.e., 2-methyl-2-propenoyl, amine and alcohol derivatives, and the like;

"alkyl" and "alkylene" mean the monovalent and divalent residues remaining after removal of one and two hydrogen atoms, respectively, from linear or branched chain hydrocarbons having 1 to 20 carbon atoms;

"lower alkyl" means $C_1$ to $C_4$ alkyl;

"aryl" means the monovalent residue remaining after removal of a hydrogen atom from an aromatic compound (single ring and multi- and fused-ring) having 5 to 12 ring atoms and includes substituted aromatics such as by lower alkaryl and aralkyl, lower alkoxy, N,N-di(lower alkyl)amino, nitro, cyano, halo, and lower alkyl carboxylic ester, wherein "lower" means $C_1$ to $C_4$;

"fluorinated" or "fluoro" means hydrocarbon groups in which at least 50 percent of the hydrogen atoms have been replaced by fluorine.

As is well understood in this technical area, a large degree of substitution is not only tolerated, but is often advisable. As a means of simplifying the discussion and the recitation of these groups, the terms "group" and "moiety" are used to differentiate between chemical species that allow for substitution or which may be substituted. For example, the phrase "alkyl group" is intended to include not only pure hydrocarbon alkyl chains such as methyl, ethyl, octyl, cyclohexyl, isooctyl, tert-butyl and the like, but also such alkyl chains bearing such conventional substituents in the art such as hydroxyl, alkoxy, phenyl, halo (F, Cl, Br, I), cyano, nitro, amino, etc. The phrase "alkyl moiety" on the other hand is limited to the inclusion of only pure hydrocarbon alkyl chains such as methyl, ethyl, propyl, cyclohexyl, isooctyl, tert-butyl, and the like.

It is believed that the reaction of a 4-(1',1'-dihydroperfluoroalkoxy)phenol with 4-(omega-acryloyloxyalkoxy)benzoic acid or 4-(omega-methacryloyloxyalkoxy)benzoic acid or 4-(omega-acryloyloxyalkoxy)benzoyl chloride or 4-(omega-methacryloyloxyalkoxy)benzoyl chloride to yield reactive liquid crystalline monomers, which contain long fluorinated alkoxy or alkyl groups, has not been previously reported.

Polymers and copolymers of the invention exhibit lower birefringence, increased hydrophobicity, and lower viscosity than do their hydrocarbon analogues.

DETAILED DESCRIPTION OF PREFERRED EMBODIMENTS OF THE INVENTION

Preferred polymerizable side-chain liquid crystal monomers of the present invention can be prepared as shown in the REACTION EQUATIONS A, B, C, and D, below, wherein $R^2$ can be a chloro, bromo, or iodo, n can be an integer 2 to 12, R can be as defined above but preferably is hydrogen, methyl, chloro, fluoro, or trifluoromethyl, m can be an integer 1 to 12, and Q is a halogen atom, preferably chlorine

REACTION EQUATIONS

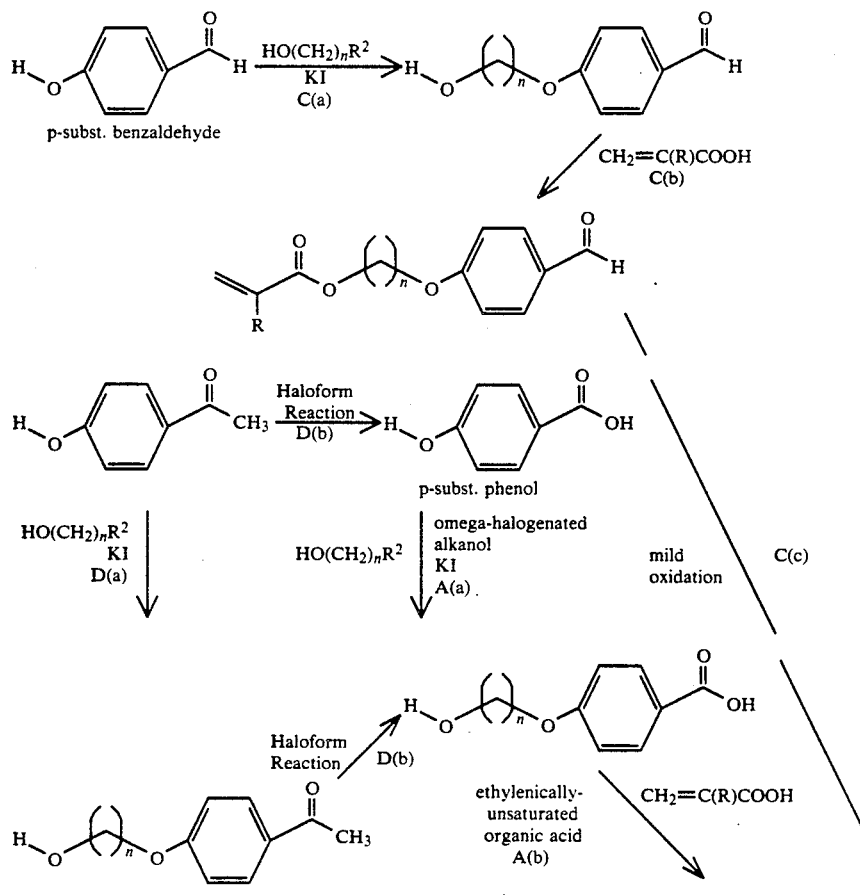

REACTION EQUATIONS -continued

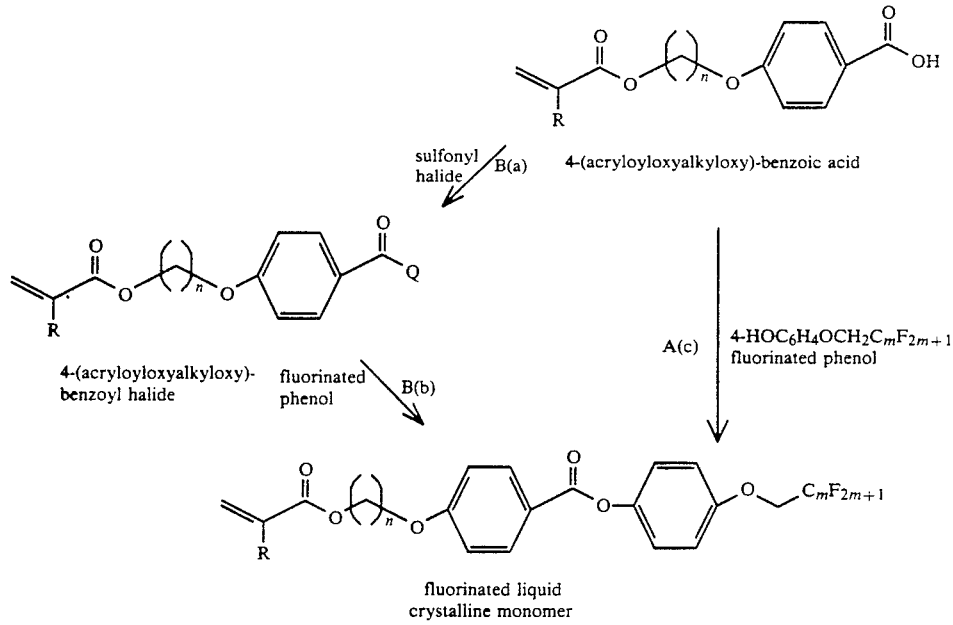

Representative polymerizable side-chain liquid crystal monomers of the present invention include those having the formula:

| R | n | m | Formula | Name |
|---|---|---|---------|------|
| H | 2 | 3 | $C_{22}H_{17}F_7O_6$ | 4-[4'-(2''-acryloyloxyethyloxy)-benzoyloxy]-1-(1''',1'''-dihydro-perfluorobutyloxy)benzene |
| H | 6 | 3 | $C_{26}H_{25}F_7O_6$ | 4-[4'-(6''-acryloyloxyhexyloxy)-benzoyloxy]-1-(1''',1'''-dihydro-perfluorobutyloxy)benzene |
| H | 8 | 3 | $C_{28}H_{29}F_7O_6$ | 4-[4'-(8''-acryloyloxyoctyloxy)-benzoyloxy]-1-(1''',1'''-dihydro-perfluorobutyloxy)benzene |
| H | 11 | 3 | $C_{31}H_{35}F_7O_6$ | 4-[4'-(11''-acryloyloxyundecyloxy)-benzoyloxy]-1-(1''',1'''-dihydro-perfluorobutyloxy)benzene |
| H | 6 | 1 | $C_{24}H_{25}F_3O_6$ | 4-[4'-(6''-acryloyloxyhexyloxy)-benzoyloxy]-1-(1''',1'''-dihydro-perfluoroethyloxy)benzene |
| H | 6 | 7 | $C_{30}H_{25}F_{15}O_6$ | 4-[4'-(6''-acryloyloxyhexyloxy)-benzoyloxy]-1-(1''',1'''-dihydro-perfluorooctyloxy)benzene |
| $CH_3$ | 3 | 3 | $C_{24}H_{21}F_7O_6$ | 4-[4'-(3''-methacryloyloxypropyloxy)benzoyloxy]-1-(1''',1'''-dihydroperfluorobutyloxy)benzene |
| $CH_3$ | 6 | 3 | $C_{27}H_{27}F_7O_6$ | 4-[4'-(6''-methacryloyloxyhexyloxy)benzoyloxy]-1-(1''',1'''-dihydroperfluorobutyloxy)benzene |

In the process of the invention, the initial reaction (REACTION EQUATION step A(a)) to yield a 4-(omega-hydroxyalkyloxy)benzoic acid is the reaction of an omega-halogenated alkanol in the presence of a para-substituted phenoxide. The phenoxide is generated in a basic aqueous-alcoholic medium and the reaction is facilitated in the presence of an inorganic salt, preferably potassium iodide. Examples of halogenated alkanols would include: 2-bromoethanol, 2-chloroethanol, 2-fluoroethanol, 2-iodoethanol, 3-bromo-1-propanol, 3-chloro-1-propanol, 4-chloro-1-butanol, 6-bromo-1-hexanol, 6-chloro-1-hexanol, 8-bromo-1-octanol, 10-chloro-1-decanol, 11-bromo-1-undecanol, and 12-bromo-1-dodecanol. These materials are commercially available, for example, from Aldrich Chemical Co., Milwaukee, Wis. Other suitable halogenated alkanols include: 2-(2-chloroethoxy)ethanol, 3-bromo-2,2-dimethyl-1-propanol, 3-chloro-2,2-dimethyl-1-propanol, (R)-(−)-3-bromo-2-methyl-1-propanol, (S)-(+)-3-bromo-2-methyl-1-propanol, 2-chlorocyclohexanol, and the like. These compounds are commercially available from Aldrich Chemical Co., Milwaukee, Wis.

The phenoxide may be generated using an inorganic alkali such as sodium hydroxide, potassium hydroxide, calcium hydroxide, or the like. Potassium hydroxide is the preferred inorganic base. The aqueous-alcoholic medium may include aqueous-methanol, -ethanol, propanol, -butanol, and the like. It is preferable to carry out the process of the invention in aqueous ethanol with a volume to volume ratio of water to alcohol being 1 to 2, respectively. Reactions may take place at ambient temperature but are enhanced at elevated (reflux) temperatures. Phenoxides may be formed utilizing para-substituted benzoic acids such as: 4-hydroxybenzoic acid (most preferred), 4-hydroxyphenylacetic acid, 3-(4'-hydroxyphenyl)propionic acid, 4-hydroxyphenylpyruvic acid, 3-chloro-4-hydroxybenzoic acid hemihydrate, 4-hydroxy-3-methoxybenzoic acid, 3,5-di-tert-butyl-4-hydroxybenzoic acid, 3,5-dichloro-4-hydroxybenzoic acid, syringic acid, and 3,5-diiodo-4-p-hydroxyphenoxyphenylacetic acid (diiodothyroacetic acid). These compounds are commercially available from Aldrich Chemical Co., Milwaukee, Wis.

Esterification of 4-(omega-hydroxyalkyloxy)benzoic acid (REACTION EQUATION step A(b)) to give 4-(omega-acryloyloxyalkyloxy)benzoic acid is accomplished with an ethylenically-unsaturated organic acid in a solvent which is inert under the reaction conditions employed. Reaction solvents favored are those which are incompatible with water such as benzene, toluene, xylene, and chloroform. Representative organic acids include acrylic acid and methacrylic acid available from Aldrich Chemical Co., Milwaukee, Wis., or 2-chloroacrylic acid available from Monomer-Polymer and Dajac Laboratories, Inc., Trevose, Pa. Continuous removal of the aqueous phase from the reaction mixture by use of a Dean-Stark water trap throughout the duration of the reaction enhances the kinetics of the process. Preferred reaction temperatures of the process are at reflux. The esterification reaction is enhanced in the presence of minor amounts, i.e. 0.01 to 1.0 weight percent, of an organic acid such as para-toluenesulfonic acid, camphorsulfonic acid, trifluoroacetic acid, or trifluoromethanesulfonic acid (triflic acid). The reaction is yet further enhanced by addition of an inorganic acid, such as boric acid, in conjunction with the organic acid. Because of the reactive nature of the polymerizable acrylate group, it is desirable to carry out this stage of the process in the presence of a free-radical scavenger, to prevent premature polymerization of this resultant intermediate. Polymerization inhibitors such as hydroquinone, hydroquinone monomethyl ether, or phenothiazine are suitable. These compounds are commercially available from Aldrich Chemical Co., Milwaukee, Wis.

Fluorinated liquid crystalline monomers, 4-[4'-(omega-acryloyloxyalkyloxy)benzoyloxy]-1-(1'',1''-dihydroperfluoroalkyloxy)benzene, are generated by action of 4-(omega-acryloyloxyalkyloxy)benzoic acid with a suitable fluorinated phenol (REACTION EQUATION step A(c)). Fluorinated phenols are generated using the methods disclosed in U.S. Pat. No. 4,886,619, which is incorporated herein by reference. Representative fluorinated phenols include: 4-(1',1'-dihydroperfluorobutoxy)phenol, 4-(1',1'-dihydroperfluorohexyloxy)phenol, 4-(1',1'-dihydroperfluorooctyloxy)phenol, 4-(1',1',2',2'-tetraperfluorohexyloxy)phenol, 4-(1',1',7'-trihydroperfluoroheptyloxy)phenol, 4-(1',1',11'-trihydroperfluoroundecyloxy)phenol, 1-(4'-hydroxyphenoxy)-2-(1'',1''-dihydroperfluorooctyloxy) ethane, and 4-(1',1'-dihydroperfluoroethoxy)phenol. Fluorinated precursors of the process are commercially available from Minnesota Mining and Manufacturing, St. Paul, Minn. or E. I. Dupont DeNemours, Wilmington, Del. Esterification reactions can be carried out in halogenated solvents such as dichloromethane, chloroform, dichloroethane, carbon tetrachloride, and the like. Other suitable solvents include acetonitrile, diethyl ether, tetrahydrofuran, toluene, and the like. Where solubility of the reactants is limited, mixtures of solvents may be employed. Processes of the invention may be accomplished by use of a dehydrating agent. Representative dehydrating agents useful in the invention process include N,N'-dicyclohexylcarbodiimide (most preferred), trifluoroacetic anhydride, N,N'-carbonyldiimidazole, and the like. Preferably, these can be present in an amount in the range 100 to 150 mole percent. Reactions can be catalyzed in the presence of minor amounts, e.g. 0.01 to 0.05 weight percent, of 4-dimethylaminopyridine. Reaction temperatures are quite mild. For many purposes, temperatures of 15° to 30° C. are adequate.

Another approach to the preparation of fluorinated liquid crystalline monomers is to transform 4-(omega-acryloyloxyalkyloxy)benzoic acid to its acid halide, preferably acid chloride, 4-(omega-acryloyloxyalkyloxy)benzoyl chloride, as is outlined in REACTION EQUATIONS B(a) and B(b), above.

This transformation may be accomplished by action of a sulfonyl halide, for example a sulfonyl chloride, such as thionyl chloride on 4-(omega-acryloyloxyalkyloxy)benzoic acid. Oxalyl chloride may also be employed in acylation of benzoic acid. Reactions can be catalyzed, for example, by addition of N,N-dimethylformamide. It may also be desirable to carry out this portion of the synthetic process of the invention in the presence of a polymerization inhibitor. Suitable radical scavengers are, for example, substituted phenols such as 2,6-di-tert-butyl-4-methylphenol, commercially available under the trade name Ultranox 226 TM (Borg-Warner Chemicals, Inc., Parkersburg, N.Y.), or octadecyl-3,5-di-tert-butyl-4-hydroxyhydrocinnamate, commercially available under the trade names Isonox 132 TM (Schenectady Chemicals, Inc., Schenectady, N.Y.) or Vanox 1320 TM (Vanderbilt Co., Inc., Norwalk, Conn.). The reaction can be performed at ambient temperature. Preferred temperatures are 0° C. to 25° C.

The 4-(omega-acryloyloxyalkyloxy)benzoyl chloride prepared above can be used in the formation of 4-[4'-(omega-acryloyloxyalkyloxy)benzoyloxy]-1-(1'',1''-dihydroperfluoroalkyloxy)benzene. REACTION EQUATION step B(b) process can be performed in an ethereal solvent. Ethereal solvents such as tetrahydrofuran, diethyl ether, glyme, and the like, are suitable. It is preferable to carry out the process of the invention under dry, i.e., non-aqueous conditions, to avoid side reactions of the acid chloride. It is also preferred to carry out the process in the presence of a base such as triethylamine. The process may also be performed with other organic bases such as tripropylamine, tributylamine, trihexylamine, trioctylamine, triphenylamine, and the like. Temperatures required to carry out the process are generally below room temperature (23° C.). Temperatures of 0° to 10° C. are adequate.

Another process to provide 4-(omega-acryloyloxyalkyloxy)benzoic acid is given in REACTION EQUATIONS C(a), C(b), and C(c) above.

In a process known in the art, a parasubstituted hydroxy benzaldehyde is utilized in the preparation of 4-(omega-hydroxyalkyloxy)benzaldehyde. Action of an omega-halogenated-1-alkanol in the presence of a parasubstituted phenoxide is again the key synthetic process of the invention (REACTION EQUATION step C(a)). The phenoxide is generated in a basic aqueous-alcoholic medium and the reaction is facilitated in the presence of an inorganic salt, such as potassium iodide. Omega-halogenated alkanols are those previously disclosed above. Phenoxides useful in this invention may be generated from para-hydroxybenzaldehydes. Suitable benzaldehydes include: 4-hydroxybenzaldehyde, vanillin, 3-ethoxy-4-hydroxybenzaldehyde, 4-hydroxy-3-nitrobenzaldehyde, 3,5-dimethyl 4 hydroxybenzaldehyde, 3,5-di-tert-butyl-4-hydroxybenzaldehyde, syringaldehyde, 3-chloro-4-hydroxy-5-methoxybenzaldehyde, 5-bromovanillin, 5-iodovanillin, and 5-nitrovanillin. These compounds are commercially available from Aldrich Chemical Co., Milwaukee, Wis. 4-Hydroxybenzaldehyde is most preferred.

Phenoxides may be generated using an inorganic alkali such as sodium hydroxide, potassium hydroxide, calcium hydroxide, or the like. Sodium hydroxide is the preferred inorganic base. The aqueous-alcoholic medium may include aqueous-methanol, -ethanol, -propanol, -butanol, and the like. It is preferable to carry out the process of the invention in aqueous methanol with a volume to volume ratio of water to methanol of 1 to 3.75, respectively. Reactions are at ambient temperature but are enhanced at elevated (reflux) temperatures.

Esterification of 4-(omega-hydroxyalkyloxy)benzaldehyde to give 4-(omega-acryloyloxyalkyloxy)benzaldehyde is accomplished with an ethylenically-unsaturated organic acid halide (REACTION EQUATION step C(b)). Suitable organic acid halides include acryloyl chloride and methacryloyl chloride commercially available from Aldrich Chemical Co., Milwaukee, Wis. The preferred polar organic solvent to accomplish the synthetic process is N,N-dimethylaniline. Reaction temperatures of the process are quite mild, e.g., room temperature or below. For many purposes, temperatures of 0° to 10° C. are adequate.

To perform the oxidation process where the 4-(omega-acryloyloxyalkyloxy)benzaldehyde is converted to the corresponding 4-(omega-acryloyloxyalkyloxy)benzoic acid, a mild buffered reaction medium can be employed (REACTION EQUATION step C(c)). Processes are preferably carried out in solvents which are inert to reaction conditions.

Suitable polar organic solvents for this transformation include methanol, ethanol, propanol, t-butanol, and the like. A co-solvent such as 2-methyl-2-butene is beneficial in the process. A solvent mixture of t-butanol and 2-methyl-2-butene in a 4 to 1 volume ratio, is preferred.

Oxidation agents of the invention must not disturb the reactive polymerizable group. Oxidation agents may include peracids such as perbenzoic acid, peracetic acid, peroxytrifluoroacetic acid, or the like. Inorganic oxidation agents such as a permanganate, chromic acid, bromine, silver oxide, sodium chlorite, and the like may also be employed in the process of the invention. To prevent transesterification during the process, it is preferable to use a buffer in connection with the oxidation agent. The most preferable combination of oxidation agent and buffer is sodium chlorite and sodium phosphate, monobasic monohydrate. To conduct the oxidation process, the oxidation agent and the buffer are solvolyzed in an aqueous medium, e.g., water.

It is preferred to carry out the process at room temperature (e.g. 20°–25° C.). Addition of the aqueous oxidation/buffer mixture to the oxidation substrate solvolyzed in a solvent mixture of t-butanol and 2-methyl-2-butene in a 4 to 1 volume ratio, is preferred.

Another process which can provide the desired 4-(omega-hydroxyalkyloxy)benzoic acid (REACTION EQUATION step A(a)), is given in REACTION EQUATIONS D(a) and D(b), above.

In a process well known in the art, a parasubstituted acetophenone can be utilized as a key starting material in the synthetic process. For example, p-hydroxyacetophenone (commercially available from Aldrich Chemical Co., Milwaukee, Wis.) may be etherified to provide a 4-(omega-hydroxyalkyloxy)acetophenone (REACTION EQUATION step D(a)). This acetophenone, in turn, can be caused to undergo the haloform reaction, a reaction well known in the art (see Organic Chemistry by L. F. Fieser and M. Fieser, D. C. Heath, Boston, Mass., 1950, pp. 152-155, p. 739) to convert the acetophenone to the 4-(omegahydroxyalkyloxy)benzoic acid (REACTION EQUATION step D(b)). This acid can then be caused to undergo esterification (REACTION EQUATION step A(c)) to give the desired fluorinated liquid crystalline monomer.

Alternatively, one could prepare 4-hydroxybenzoic acid from p-hydroxyacetophenone and then proceed through the haloform reaction as indicted in the REACTION EQUATION step D(b), above.

Transformation of 4-(omega-acryloyloxyalkyloxy)-benzoic acid to the fluorinated liquid crystalline monomer, 4-[4'-(omega-acryloyloxyalkyloxy)benzoyloxy]-1-(1",1"-dihydroperfluoroalkyloxy)benzene, has been discussed previously (vide supra).

Preferred monomers of the invention are those wherein R of Formula I is hydrogen or methyl, n is six, and m is three.

By reason of the unsaturation of the monomers, novel and useful polymers of the invention, which preferably are liquid crystalline, are obtained by polymerization of monomers of Formula I to form homopolymers having the structure of Formula II:

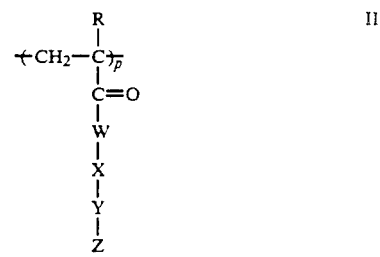

wherein

R, W, X, Y, and Z are as described above, and p is an integer having a value of 4 to 3500, preferably 20 to 600, and more preferably 50 to 300, to provide the polymers with approximate number average molecular weights in the range of 2,000 to 2 million, preferably in the range of 10,000 to 170,000, more preferably 30,000 to 110,000.

Representative examples of homopolymers include: poly-4-[4'-(6"-acryloyloxyhexyloxy)benzoyloxy]-1-(1'",1'"-dihydroperfluorobutyloxy)benzene, poly-4-[4'-

(8''-acryloyloxyoctyloxy)benzoyloxy]-1-(1''',1'''-(11''-acryloyloxyundecyloxy)benzoyloxy]-1-(1''',1'''-dihydroperfluorobutyloxy)benzene, and poly-4-[4,-(3''-methacryloyloxypropyloxy)benzoyloxy]-1-(1''',1'''-dihydroperfluorobutyloxy)benzene.

Copolymers having units of the formula

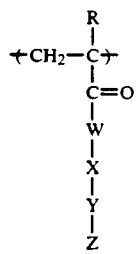

III wherein R, W, X, Y, and Z are as previously defined, can be formed from the monomers of the present invention with any compatible ethylenically-unsaturated comonomer in any proportion. Preferably, copolymers of the invention are liquid crystalline. Representative comonomers include: (a) acrylates or methacrylates such as methyl (meth)acrylate, lauryl (meth)acrylate, dodecyl (meth)acrylate, and the like; (b) styrenes such as styrene, alpha-methylstyrene, and para-chlorostyrene; (c) acrylamides and methacrylamides such as acrylamide, dimethylacrylamide, isopropylacrylamide, and phenylacrylamide; (d) ethylenically-unsaturated monomers (vinyl monomers), such as vinyl chloride, vinyl acetate, vinylidene fluoride, and vinyl azlactones, and (e) allyl derivatives, such as diallyl phthalate, triallyl cyanurate, and the like.

Preferably the copolymer contains at least 5 percent by weight of at least one monomer of the invention and most preferably at least 50 percent by weight of a monomer of the invention. Copolymers have number average molecular weights in the range of 2,000 to 2 million, preferably in the range of 10,000 to 170,000, more preferably 30,000 to 110,000.

When monomers of the invention form copolymers, units selected from the above structures and comonomer units may react in any proportion (0.1 to 99.9:99.9 to 0.1) and will be distributed throughout the polymer in a more or less random fashion depending upon the comonomer and the degree of its similarity of polymerization kinetics to those of the monomer of Formula I; as is known to those skilled in the art.

Representative examples of copolymers include:
poly-4-[4'-(3,'-methacryloyloxypropyloxy)benzoyloxy]-1-(1''',1'''-dihydroperfluorobutyloxy)benzene-co-methyl methacrylate,
poly-4-[4'-(3''-methacryloyloxypropyloxy)benzoyloxy]-1-(1''',1'''-dihydroperfluorobutyloxy)benzene-co-lauryl methacrylate,
poly-4-[4'-(6''-acryloyloxyhexyloxy)benzoyloxy]-1-(1''',1'''-dihydroperfluorobutyloxy)benzene-co-methyl methacrylate,
poly-4-[4'-(6''-acryloyloxyhexyloxy)benzoyloxy]-1-(1''',1'''-dihydroperfluorobutyloxy)benzene-co-lauryl methacrylate,
poly-4-[4'-(6''-acryloyloxyhexyloxy)benzoyloxy]-1-(1''',1'''-dihydroperfluorobutyloxy)benzene-co-4-[4'-(6''-acryloyloxyhexyloxy)benzoyloxy]-1-cyanobenzene,
poly-4-[4'-(6''-acryloyloxyhexyloxy)benzoyloxy]-1-(1''',1'''-dihydroperfluorobutyloxy)benzene-co-4-cyano-[4'-(6''-acryloyloxyhexyloxy)biphenyl,
poly-4-[4'-(6''-acryloyloxyhexyloxy)benzoyloxy]-1-(1''',1'''-dihydroperfluorobutyloxy)benzene-co-4-[4'-(3''-methacryloyloxypropyloxy)benzoyloxy]-1-(1''',1'''-dihydroperfluorobutyloxy)benzene,
poly-4-[4'-(8''-acryloyloxyoctyloxy)benzoyloxy]-1-(1''',1'''-dihydroperfluorobutyloxy)benzene-co-4-[4'-(6''-acryloyloxyhexyloxy)benzoyloxy]-1-cyanobenzene,
poly-4-[4'-(8''-acryloyloxyoctyloxy)benzoyloxy]-1-(1''',1'''-dihydroperfluorobutyloxy)benzene-co-4-cyano-[4'-(6''-acryloyloxyhexyloxy)biphenyl,
poly-4-[4'-(11''-acryloyloxyundecyloxy)benzoyloxy]-1-(1''',1'''-dihydroperfluorobutyloxy)benzene-co-4-[4'-(6''-acryloyloxyhexyloxy)benzoyloxy]-1-cyanobenzene, and
poly-4-[4'-(11''-acryloyloxyundecyloxy)benzoyloxy]-1-(1''',1'''-dihydroperfluorobutyloxy)benzene-co-4-cyano-[4'-(6''-acryloyloxyhexyloxy)biphenyl.

Preferred homopolymers and copolymers are shown in Table 1 below, wherein the mole ratio of a:b can be in the range of 0.1:99.9 and more preferably 99.9: 0.1.

Polymerization of the monomers may be carried out by employing initiators which generate free radicals on application of activating energy as is conventionally used in the polymerization of ethylenically-unsaturated monomers. Included among useful free radical initiators are thermally activated initiators such as organic peroxides, organic hydroperoxides, and azo compounds. Representative examples of such initiators include benzoyl peroxide, tertiary-butyl perbenzoate, diisopropyl peroxydicarbonate, cumene hydroperoxide, azobis(isobutyronitrile) (AIBN), and the like. Generally, from about 0.1 to 5 percent by weight of thermal initiator is used.

Actinic radiation may be utilized to initiate polymerization. High energy electrons emitted from commercial electron beam generators are commonly employed in these ionizing radiation systems. Photoinitiators may also be employed to initiate polymerization. Such initiators are well known and have been described in the polymerization art, e.g. Chapter II of "Photochemistry" by Calvert and Pitts, Wiley, New York, 1966. Preferred photoinitiators are those which facilitate polymerization when a composition is irradiated with ultraviolet light. Representative examples of such initiators include acyloin and derivatives thereof, such as benzoin, benzoin ethyl ether, benzoin isopropyl ether, alpha-methylbenzoin; diketones such as benzil, and diacetyl, etc.; ketones such as acetophenone, methyl benzoylformate, 2-hydroxy-2-methyl-1-phenyl-1-propanone, benzophenone, and the like. Normally, the photoinitiator is used in amounts ranging from about 0.001 to 5 percent by weight of the total monomeric composition. Preferably, about 0.05 to 1.0 percent of photoinitiator based on the total composition is used in the polymerizable compositions.

When the activating energy is only heat, polymerization is usually carried out at a temperature in the range of 40° to 140° C. for about 5 to 48 hours. It is to be understood that polymerization conditions are not limited to the stated temperature or time conditions, nor is initiation limited to use of ultraviolet radiation or heat. It is also within the scope of the invention for 2-stage curing to be utilized, i.e. radiation and heat in either order or simultaneously.

Copolymers are preferably prepared by mixing compatible ethylenically-unsaturated monomers with the monomers of the invention in the presence of free radical catalysts in the presence of heat or UV irradiation as necessary for suitable reaction rate to obtain the desired copolymers.

The novel fluorinated liquid crystalline polymers and copolymers of the present invention are useful in electrooptical devices. In an electric field, the polymers and copolymers of the invention exhibit the same electrooptic effects as low molecular weight liquid crystalline materials. However, these polymeric materials have the advantage over the low molecular weight materials in that the polymers offer the possibility of storing information in electrooptical displays, since the mesophases can be stabilized by cooling the polymer to its glass transition temperature ($T_g$). Moreover, polymers and copolymers of the invention exhibit lower birefringence, increased hydrophobicity, and lower viscosity than do their hydrocarbon analogues and provide an advantage in ease of preparation of electrooptical devices.

Objects and advantages of this invention are further illustrated by the following examples, but the particular materials and amounts thereof recited in these examples, as well as other conditions and details, should not be construed to unduly limit this invention.

EXAMPLES

In the following examples, all monomeric intermediates and products were confirmed and characterized by one or more of the following analytical methods: $^1$H NMR (proton nuclear magnetic resonance spectroscopy), $^{19}$F NMR (fluorine nuclear magnetic resonance spectroscopy), IR (infrared spectroscopy), MS (mass spectroscopy), and HRMS (high resolution mass spectroscopy). Monomeric intermediates and products were consistent with their structures based on satisfactory analytical data and interpretations.

Example 1

Preparation of 4-(omega-hydroxyethoxy)benzoic acid

In a one liter, three-necked round-bottomed flask fitted with a mechanical stirrer, addition funnel, and reflux condenser, were charged potassium hydroxide (available from Fisher Scientific Co., Fair Lawn, N.J.) (92 grams; 1.7 moles), water (128 mL), and ethyl alcohol (256 mL). The resulting basic solution was then cautiously charged with 4-hydroxybenzoic acid (available from Aldrich Chemical Co., Milwaukee, Wis.) (100 grams; 0.7 mole) at ambient temperature. The mixture became exothermic and a homogeneous solution resulted within thirty minutes. The phenoxide solution was then treated with potassium iodide (available from Aldrich Chemical Co., Milwaukee, Wis.) (3 grams; 15 mmoles) followed by dropwise addition of 2-chloroethanol (available from Aldrich Chemical Co., Milwaukee, Wis.) (50 grams; 0.6 mole) over fifteen minutes. The solution was heated to reflux for 12 hours. The reaction mixture was cooled and ethanol was removed using a rotary evaporator. The residue was diluted with 500 mL of water and made acidic (pH~2) by addition of 4N HCl. The resulting insoluble white solid was collected by vacuum filtration and was exhaustively washed with water. The white solid was recrystallized from ethyl alcohol to leave 72 grams of material which represents a 64 percent yield from starting material. Spectral analysis confirmed the presence of 4-(omega-hydroxyethoxy)benzoic acid.

Examples 2-6

In Examples 2-6, compounds were prepared as in Example 1 except that in Example 2, 3-bromo-1-propanol (available from Aldrich Chemical Co., Milwaukee, Wis.) (100 grams; 0.7 mole) was substituted for the 2-chloroethanol; in Example 3, 6-chloro-1-hexanol (available from Aldrich Chemical Co., Milwaukee, Wis.) (100 grams; 0.7 mole) was substituted for the 2-chloroethanol; in Example 4, 8-bromo-1-octanol (available from Aldrich Chemical Co., Milwaukee, Wis.) (25 grams; 0.1 mole) was substituted for the 2-chloroethanol; in Example 5, 11-bromo-1-undecanol (available from Aldrich Chemical Co., Milwaukee, Wis.) (100 grams; 0.4 mole) was substituted for the 2-chloroethanol; and in Example 6, 12-bromo-1-dodecanol (available from Aldrich Chemical Co., Milwaukee, Wis.) (15 grams; 0.06 mole) was substituted for the 2-chloroethanol. The products were 4-(omega-hydroxypropyloxy)benzoic acid (Example 2), 4-(omega-hydroxyhexyloxy)benzoic acid (Example 3), 4-(omega-hydroxyoctyloxy)benzoic acid (Example 4), 4-(omega-hydroxyundecyloxy)benzoic acid (Example 5), and 4-(omega-hydroxydodecyloxy)benzoic acid (Example 6). Spectral analysis confirmed the presence of these products.

Example 7

Preparation of 4-(omega-hydroxyhexyloxy)benzaldehyde

In a 500 mL, three-necked round-bottomed flask, fitted with a mechanical stirrer, addition funnel, and reflux condenser, were charged sodium hydroxide (available from Fisher Scientific Co., Fair Lawn, N.J.) (11 grams; 0.3 mole), water (40 mL), and methyl alcohol (150 mL). The resulting basic solution was then cautiously charged with 4-hydroxybenzaldehyde (available from Aldrich Chemical Co., Milwaukee, Wis.) (30 grams; 0.3 mole) at ambient temperature. The dark colored phenoxide solution was then treated with potassium iodide (available from Aldrich Chemical Co., Milwaukee, Wis.) (0.3 grams; 2 mmoles) followed by dropwise addition of 6-chloro-1-hexanol (available from Aldrich Chemical Co., Milwaukee, Wis.) (34 grams; 0.3 mole) over thirty minutes. After addition was complete, the solution was heated to reflux for 48 hours. The reaction mixture was cooled and the contents of the flask poured into a separatory funnel containing dichloromethane (800 mL) and water (400 mL). The organic layer was worked up in this and appropriate subsequent examples, in a series of steps, designated as follows, and called "the organic layer was processed". By this method it is meant that the organic layer was separated, dried over anhydrous magnesium sulfate, and filtered; the filtrate was concentrated using a rotary evaporator. The residue was purified utilizing a Waters Prep LC System 500A instrument (Waters Associates, Milford, Mass.). The eluant was a solvent mixture of heptane/ethyl acetate in a 3:1 volume ratio. An analytically pure sample (greater than 99% pure) weighed 14 grams. Spectral analysis confirmed the presence of 4-(omega-hydroxyhexyloxy)benzaldehyde.

Example 8

Preparation of 4-(2'-acryloyloxyethyloxy)benzoic acid

In a two-necked 500 mL round-bottomed flask, fitted with a Dean-Stark water trap along with a reflux condenser and a ground glass stopper, was added benzene (120 mL) and acrylic acid (available from Aldrich Chemical Co., Milwaukee, Wis.) (126 grams, 1.7 moles). The solvent mixture was then charged with 4-(omega-hydroxyethyloxy)benzoic acid (from Example 1) (36 grams, 0.2 mole), hydroquinone (available from Aldrich Chemical Co., Milwaukee, Wis.) (8 grams, 70 mmoles), para-toluenesulfonic acid (available from Aldrich Chemical Co., Milwaukee, Wis.) (8 grams, 40 mmoles), and boric acid (available from Aldrich Chemical Co., Milwaukee, Wis.) (200 mg, 3 mmoles). The mixture was heated to reflux and kept at that temperature for 15 hours. The reaction mixture was cooled to room temperature and poured into a separatory funnel containing diethyl ether (500 mL). The organic solution was exhaustively washed with warm water until the odor of acrylic acid was no longer detected. The organic layer was processed. The residue was recrystallized from isopropanol to yield 29 grams of material which represents a 61 percent yield from starting material. Spectral analysis confirmed the presence of 4-(2'-acryloyloxyethyloxy)benzoic acid.

Examples 9-11

In Examples 9-11, compounds were prepared as in Example 8 except that in Example 9, 4-(omega-hydroxyhexyloxy)benzoic acid (from Example 3) (37 grams; 0.2 mole) was substituted for the 4-(omega-hydroxyethyloxy)benzoic acid; in Example 10, 4-(omega-hydroxyoctyloxy)benzoic acid (from Example 4) (15 grams; 0.1 mole) was substituted for the 4-(omega-hydroxyethyloxy)benzoic acid; and in Example 11, 4-(omega-hydroxyundecyloxy)benzoic acid (from Example 5) (11 grams; 0.04 mole) was substituted for the 4-(omega-hydroxyethyloxy)benzoic acid. The products were 4-(6'-acryloyloxyhexyloxy)benzoic acid (Example 9), 4-(8'-acryloyloxyoctyloxy)benzoic acid (Example 10), and 4-(11'-acryloyloxyundecyloxy)benzoic acid (Example 11), as confirmed by spectral analyses.

Example 12

Preparation of 4-(6'-acryloyloxyhexyloxy)benzaldehyde

In a 250 mL round-bottomed flask was charged 4-(omega-hydroxyhexyloxy)benzaldehyde (from Example 7) (13 grams; 0.06 mole) and N,N-dimethylaniline (45 mL). The resulting solution was then treated at room temperature with acryloyl chloride (available from Aldrich Chemical Co., Milwaukee, Wis.) (6 grams; 0.06 mole) by dropwise addition over 10 minutes. The resulting solution was stirred for 30 minutes at ambient temperature and diluted with water (100 mL). The aqueous mixture was made acidic (pH~2) by addition of 4N HCl, and the contents of the flask were poured into a separatory funnel containing diethyl ether (200 mL). The organic layer was separated and continuously washed with 4N HCl to remove the residual N,N-dimethylaniline. The ethereal layer was finally partitioned between water for the final extraction. The organic layer was processed. Spectral analysis of the residue indicated the material to be 4-(6'-acryloyloxyhexyloxy)benzaldehyde which was greater than 95% pure.

Example 13

Preparation of 4-(6'-acryloyloxyhexyloxy)benzoic acid (Alternative Method to Example 9)

In a 2 liter three-necked round-bottomed flask, fitted with a mechanical stirrer, dropping funnel, and ground glass stopper, were charged 4-(6'-acryloyloxyhexyloxy)benzaldehyde (from Example 12) (22 grams; 0.1 mole), tertiary-butyl alcohol (500 mL), and 2-methyl-2-butene (available from Aldrich Chemical Co., Milwaukee, Wis.) (232 grams; 3 moles). The reaction mixture was stirred at room temperature. Over two hours, a solution of sodium chlorite (available from Aldrich Chemical Co., Milwaukee, Wis.) (65 grams; 0.7 mole) and sodium phosphate, monobasic monohydrate (available from Aldrich Chemical Co., Milwaukee, Wis.) (75 grams; 0.5 mole) in water (300 mL) was added. The reaction mixture was stirred for 12 hours at ambient temperature at which time the organic solvents were concentrated by rotary evaporator. The residue was then dissolved in diethyl ether (500 mL) and the mixture was made acidic (pH~2) by addition of 4N HCl. The mixture was poured into a separatory funnel and the organic layer was processed. The residue was recrystallized from ethanol. Spectral analysis confirmed the presence of 4-(6'-acryloyloxyhexyloxy)benzoic acid. The crystals weighed 15 grams which represents a 65 percent yield based on starting material.

Example 14

Preparation of 4-(11'-methacryloyloxyundecyloxy)benzoic acid

In a three-necked 250 mL round-bottomed flask, fitted with a Dean-Stark water trap along with a reflux condenser, a mechanical stirrer, and a ground glass stopper, was added benzene (50 mL) and methacrylic acid (available from Aldrich Chemical Co., Milwaukee, Wis.) (51 grams, 0.6 mole). The solvent mixture was then charged with 4-(omega-hydroxyundecyloxy)benzoic acid (from Example 5) (15 grams, 0.05 mole), hydroquinone (available from Aldrich Chemical Co., Milwaukee, Wis.) (2 grams, 0.02 mole), para-toluenesulfonic acid (available from Aldrich Chemical Co., Milwaukee, Wis.) (2 grams, 0.01 mole), and boric acid (available from Aldrich Chemical Co., Milwaukee, Wis.) (50 mg, 0.8 mmole). The reaction mixture was heated to reflux and kept at that temperature for 12 hours. The reaction mixture was cooled to room temperature at which time the material solidified. The solid residue was then dissolved in hot ethanol (400 mL) which afforded the desired compound as confirmed by spectral analysis, in greater than 95% purity.

Examples 15-16

In Examples 15-16, compounds were prepared as in Example 14 except that in Example 15, 4-(omega-hydroxypropyloxy)benzoic acid (from Example 2) (25 grams, 0.1 mole) was substituted for the 4-(omega-hydroxyundecyloxy)benzoic acid; in Example 16, 4-(omega-hydroxyhexyloxy)benzoic acid (from Example 3) (77 grams, 0.9 mole) was substituted for the 4-(omega-hydroxyundecyloxy)benzoic acid. The thus-produced products, as confirmed by spectral analyses, were 4-(3'-methacryloyloxypropyloxy)benzoic acid (Example 15) and 4-(6'-methacryloyloxyhexyloxy)benzoic acid (Example 16).

Example 17

Preparation of 4-[4'-(6''-acryloyloxyhexyloxy)benzoyloxy]-1-(1''',1'''-dihydroperfluorobutyloxy)benzene In a 250 mL round-bottomed flask, were charged 4-(6'-acryloyloxyhexyloxy)benzoic acid (from Example 9) (9 grams, 0.03 mole), dichloromethane (100 mL), and THF (50 mL). The resulting solution was stirred at ambient temperature and treated with 4-(1',1'-dihydroperfluorobutyloxy)phenol (prepared as disclosed in U.S. Pat. No. 4,886,619, Example 21) (9 grams, 0.03 mole) followed by the addition of N,N'-dicyclohexylcarbodiimide (available from Aldrich Chemical Co., Milwaukee, Wis.) (6 grams, 0.03 mole), and N,N-dimethylaminopyridine (available from Aldrich Chemical Co., Milwaukee, Wis.) (0.6 grams, 5 mmoles). The reaction mixture was stirred for 20 hours under an atmosphere of nitrogen. The insoluble N,N'-dicyclohexylurea was filtered by gravity from the reaction medium and the filtrate concentrated under reduced pressure to leave a sirupy residue. The residue was taken up in dichloromethane (150 mL) and the solution was transferred into a separatory funnel. The organic layer was washed one time each with 0.5 M HCl, 5% sodium bicarbonate, water, and saturated brine in 75 mL portions. The organic layer was processed. The solid residue was recrystallized from ethanol to leave 8 grams of desired compound, as confirmed by spectral analysis, representing a yield of 45 percent based on starting benzoic acid.

Examples 18-20

In Examples 18-20, compounds were prepared as in Example 17 except that in Example 18, 4-(2'-acryloyloxyethyloxy)benzoic acid (from Example 8) (4 grams; 0.02 mole) was substituted for the 4-(6'-acryloyloxyhexyloxy)benzoic acid; in Example 19, 4-(8'-acryloyloxyoctyloxy)benzoic acid (from Example 10) (6 grams; 0.02 mole) was substituted for the 4-(6'-acryloyloxyhexyloxy)benzoic acid; and in Example 20, 4-(11'-acryloyloxyundecyloxy)benzoic acid (from Example 11) (4 grams; 0.02 mole) was substituted for the 4-(6'-acryloyloxyhexyloxy)benzoic acid. The products, as confirmed by spectral analyses, were 4-[4'-(2''-acryloyloxyethyloxy)benzoyloxy]-1-(1''',1'''-dihydroperfluorobutyloxy)benzene (Example 18), 4-[4'-(8''-acryloyloxyoctyloxy)benzoyloxy]-1-(1''',1'''-dihydroperfluorobutyloxy)benzene (Example 19), and 4-[4'-(11''-acryloyloxyundecyloxy)benzoyloxy]-1-(1''',1'''-dihydroperfluorobutyloxy)benzene (Example 20).

Example 21

Preparation of 4-[4'-(6''-acryloyloxyhexyloxy)benzoyloxy]-1-(1''',1'''-dihydroperfluorobutyloxy)benzene (Alternative Method to Example 17)

In a flame dried 250 mL one-necked round-bottomed flask, was placed 4-(6'-acryloyloxyhexyloxy)benzoic acid (from Example 9) (30 grams, 0.1 mole) and oxalyl chloride (available from Aldrich Chemical Co., Milwaukee, Wis.) (102 grams, 0.8 mole). The organic mixture was then treated with 2,6-di-tert-butyl-4-methyl phenol (available from Borg-Warner Chemicals, Inc., Parkersburg, N.Y.) (0.3 grams, mmoles) and one drop of anhydrous N,N-dimethylformamide. Gas evolution, observed immediately upon the addition of the N,N-dimethylformamide, ceased after one hour and excess oxalyl chloride was removed by reduced pressure. The residue, 4-(6'-acryloyloxyhexyloxy)benzoyl chloride, was then azeotroped with toluene (50 mL) to provide anhydrous acid chloride in quantitative yield.

The 4-(6'-acryloyloxyhexyloxy)benzoyl chloride (31 grams, 0.1 mole) in anhydrous tetrahydrofuran (100 mL) was then added dropwise to a solution of 4-(1',1'-dihydroperfluorobutyloxy)phenol (prepared as in U.S. Pat. No. 4,886,619, Example 21) (30 grams, 0.1 mole) in anhydrous tetrahydrofuran (100 mL) containing triethylamine (available from Aldrich Chemical Co., Milwaukee, Wis.) (20 mL). Addition time of the acid chloride was 40 minutes and the reaction temperature was not allowed to rise above 10° C. during the addition. After addition was complete, the reaction mixture was stirred at room temperature for 12 hours under a nitrogen atmosphere. The resulting insoluble triethylamine-hydrochloride was filtered from the reaction mixture by gravity and the filtrate was transferred into a separatory funnel. The filtrate was diluted with dichloromethane (300 mL) and the organic solution was washed one time each with 5% sodium bicarbonate, 0.5N HCl, and water in 50 mL portions. The organic layer was processed. The light yellow colored solid that remained was recrystallized from ethanol to provide greater than 99% pure desired material, as confirmed by spectral analysis. The material weighed 35 grams which represents a 85 percent yield based on starting benzoic acid.

Examples 22-23

In Examples 22-23, compounds were prepared as in Example 21 except that in Example 22, 4-(1',1'-dihydroperfluoroethyloxy)phenol (prepared as in U.S. Pat. No. 4,886,619, Example 21) (8 grams, 40 mmoles) was substituted for the 4-(1',1'-dihydroperfluorobutyloxy)phenol; and in Example 23, 4-(1',1'-dihydroperfluorooctyloxy)phenol (prepared as in U.S. Pat. No. 4,886,619, Example 21) (2 grams, 4 mmoles) was substituted for the 4-(1',1'-dihydroperfluorobutyloxy)phenol. The products, as confirmed by spectral analysis, were 4-[4'-(6''-acryloyloxyhexyloxy)benzoyloxy]-1-(1''',1'''-dihydroperfluoroethyloxy)benzene (Example 22) and 4-[4'-(6''-acryloyloxyhexyloxy)benzoyloxy]-1-(1''',1'''-dihydroperfluorooctyloxy)benzene (Example 23).

Example 24

Preparation of 4-[4'-(3''-methacryloyloxypropyloxy)-benzoyloxy]-1-(1''',1'''-dihydroperfluorobutyloxy)benzene In a 250 mL one-necked round-bottomed flask, was placed 4-(3'-methacryloyloxypropyloxy)benzoic acid (from Example 15) (14 grams, 0.06 mole) and thionyl chloride (available from Aldrich Chemical Co., Milwaukee, Wis.) (89 grams, 0.7 mole). The organic mixture was then treated with a catalytic amount of 2,6-di-tert-butyl-4-methylphenol (available from Borg-Warner Chemicals, Inc., Parkersburg, N.Y.) and two drops of anhydrous N,N-dimethylformamide. Gas evolution was observed immediately upon addition of N,N-dimethylformamide and continued for 30 minutes. Excess thionyl chloride was removed using reduced pressure followed by high vacuum (vacuum pump). Residual 4-(3'-methacryloyloxypropyloxy)benzoyl chloride (17 grams, 0.06 mole) was dissolved in anhydrous tetrahydrofuran (50 mL) and added dropwise to a solution of 4-(1',1'-dihydroperfluorobutyloxy)phenol (prepared as in U.S. Pat. No. 4,886,619, Example 21) (16 grams, 0.06 mole) in anhydrous tetrahydrofuran (50 mL) containing triethylamine (15 mL). The reaction temperature was not allowed to rise above 10° C. during addition of the acid chloride. After addition was complete, the reaction mixture was stirred at ambient temperature for 4 hours under a nitrogen atmosphere. Tetrahydrofuran was removed from the reaction medium by use of a rotary evaporator and the residue was dissolved in dichloromethane (100 mL). The organic solution was poured into a separatory funnel and was washed three times with water (25 mL). The organic layer was processed. The residue was purified utilizing a Waters Prep LC System 500A instrument employing a toluene eluant. A pure sample weighed 19 grams which represents a 64 percent yield was obtained. Identity of the product was confirmed by spectral analysis.

Example 25

Preparation of 4-[4'-(6''-methacryloyloxyhexyloxy)-benzoyloxy-1-(1''',1'''-dihydroperfluorobutyloxy)benzene In a 500 mL one-necked round-bottomed flask was charged 4-(6'-methacryloyloxyhexyloxy)benzoic acid (from Example 16) (10 grams, 0.03 mole) and 4-(1',1'-dihydroperfluorobutyloxy)phenol (prepared as in U.S. Pat. No. 4,886,619, Example 21) (20 grams, 0.03 mole). The mixture was then dissolved in a solvent system of (4:1) dichloromethane/tetrahydrofuran (125 mL). The resulting solution was treated with N,N'-dicyclohexylcarbodiimide (available from Aldrich Chemical Co., Milwaukee, Wis.) (7 grams, 0.03 mole), and N,N-dimethylaminopyridine (available from Aldrich Chemical Co., Milwaukee, Wis.) (0.6 grams, 5 mmoles). The reaction mixture was stirred under a nitrogen atmosphere at room temperature for 12 hours. Insoluble organic matter was removed from the reaction mixture by gravity filtration and the filtrate was concentrated by a rotary evaporator to leave a white solid residue. The residue was dissolved in dichloromethane (50 mL) and poured into a separatory funnel. The organic solution was washed with 75 mL portions of 0.5N HCl, 5% sodium bicarbonate, water, and finally saturated brine. The organic layer was processed. The solid residue was recrystallized from hot ethanol (200 mL) to leave 9 grams of pure compound. Identity of the compound was confirmed by spectral analysis.

Examples 26-44

Preparation of Fluorinated Liquid Crystalline Homopolymers and Copolymers

The monomers described in Examples 17-25 were subjected to free-radical homo- and copolymerization reactions in an isotropic solution by the following general procedure:

A glass polymerization vessel was charged with desired fluorinated monomer and dissolved in either tetrahydrofuran, ethyl acetate, benzene, or toluene to provide a 20% solids solution. A free-radical initiator, such as AIBN, was added in a 1 mole percent ratio (with respect to monomer) and the solution was purged to remove air with an inert gas such as nitrogen for 5 minutes. The polymerization vessel was sealed and immersed in a thermostatically controlled environment (65° C.) for 24-48 hours to effect polymerization. The polymerization solvent was removed by a rotary evaporator and the residual polymer was dissolved in a minimum amount of dichloromethane. The polymer was then precipitated in cold methanol. The precipitated polymer was collected by decantation of the methanol and redissolved in dichloromethane and re-precipitated in a fresh amount of methanol. This procedure was repeated until no monomer was detected by thin layer chromatography. The polymer was then dried at room temperature in a high vacuum oven until a constant weight was achieved. The polymers were subjected to nuclear magnetic resonance spectrometry to confirm structure and copolymer ratios, gel permeation chromatography (GPC) to determine molecular weights, differential scanning calorimetry (DSC) to determine glass transition temperatures (Tg) and melt transition temperatures (Tm), and optical polarization microscopy to determine liquid crystalline mesophases.

Results of the investigations with respect to the present invention are summarized in Table 1, below.

TABLE 1

Side-Chain Liquid Crystalline Fluoropolymers

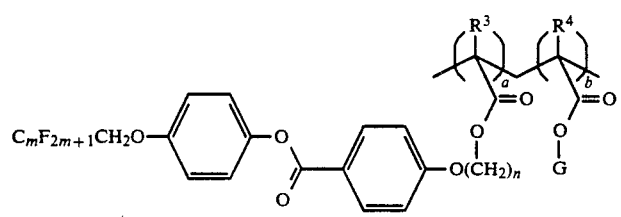

| Ex. | monomer mole ratio (a:b) | R³ | R⁴ | n | m | G | Mn | Mw | Mw/Mn | $T_g$(°C.) | $T_m$(°C.) | LC+ |
|---|---|---|---|---|---|---|---|---|---|---|---|---|
| 26 | 100:0 | Me | — | 3 | 3 | — | 51,800 | 390,700 | 7.7 | nd | 142 | Sm |
| 27 | 90:10 | Me | Me | 3 | 3 | Me | 64,500 | 290,000 | 4.5 | 70 | 126 | SmG |
| 28 | 75:25 | Me | Me | 3 | 3 | Me | 3,400 | 145,000 | 4.2 | nd | 75,89 | Sm |
| 29 | 95:5 | Me | Me | 3 | 3 | Me | 32,600 | 169,000 | 5.1 | nd | 145 | Sm |
| 30 | 75:25 | Me | Me | 3 | 3 | C₁₂H₂₅ | 32,900 | 158,000 | 4.8 | nd | 89 | Sm |
| 31 | *100:0 | H | — | 6 | 3 | — | 26,000 | 49,200 | 1.9 | 40 | 143 | SmG |
| 32 | **100:0 | H | — | 6 | 3 | — | 15,200 | 23,500 | 1.5 | 40 | 135 | SmG |
| 33 | ***100:0 | H | — | 6 | 3 | — | 6,990 | 8,470 | 1.2 | 37 | 113 | SmG |
| 34 | 50:50 | H | H | 6 | 3 | (CH₂)₆OPhCO₂PhCN | 11,700 | 18,000 | 1.5 | nd | 103,111 | SmA,SmG |
| 35 | 50:50 | H | H | 6 | 3 | (CH₂)₆OPhPhCN | 14,200 | 23,330 | 1.6 | 35 | 125 | SmA |
| 36 | 90:10 | H | Me | 6 | 3 | Me | nd | nd | nd | 34 | 111,123 | SmG |
| 37 | 85:15 | H | Me | 6 | 3 | C₁₂H₂₅ | nd | nd | nd | 24 | 106 | K |

TABLE 1-continued

Side-Chain Liquid Crystalline Fluoropolymers

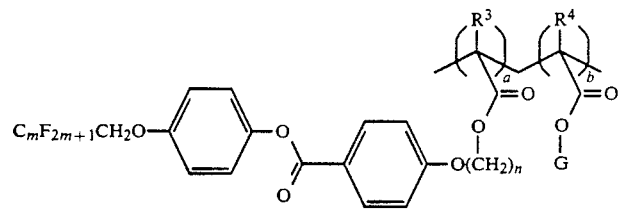

| Ex. | monomer mole ratio (a:b) | $R^3$ | $R^4$ | n | m | G | Mn | Mw | Mw/Mn | $T_g$(°C.) | $T_m$(°C.) | LC+ |
|---|---|---|---|---|---|---|---|---|---|---|---|---|
| 38 | 50:50 | H | Me | 6 | 3 | $(CH_2)_3OPhCO_2PhOCH_2C_3F_7$ | 33,900 | 69,900 | 2.0 | 56 | 125,135 | K |
| 39 | 100:0 | H | — | 8 | 3 | — | nd | nd | nd | 23 | 102 | Sm |
| 40 | 50:50 | H | H | 8 | 3 | $(CH_2)_6OPhCO_2PhCN$ | 13,000 | 22,400 | 1.7 | 5 | 66 | SmA |
| 41 | 50:50 | H | H | 8 | 3 | $(CH_2)_6OPhPhCN$ | 13,900 | 22,800 | 1.7 | 15 | 103 | SmA |
| 42 | 100:0 | H | — | 11 | 3 | — | nd | nd | nd | nd | 45,64,87 | SmG |
| 43 | 50:50 | H | H | 11 | 3 | $(CH_2)_6OPhPhCN$ | 14,400 | 24,900 | 1.7 | 14 | 100 | SmA |
| 44 | 50:50 | H | H | 11 | 3 | $(CH_2)_6OPhCO_2PhCN$ | 13,100 | 22,800 | 1.7 | nd | 100 | SmA |

All polymerizations performed using AIBN at 65° C. for 24 hours
*ethyl acetate;
**toluene;
***tetrahydrofuran;
+liquid crystalline mesophase;
Me = methyl;
Ph = phenyl
Mn = number average molecular weight
Mw = weight average molecular weight
Tg = glass transition temperature;
Tm = melting transition temperature
K = crystalline,
Sm = smectic,
nd = not determined,
SmA = smectic A,
SmG = smectic G,
AIBN = azobis(isobutyronitrile)
$R^3$ and $R^4$ are each defined the same as R (previously defined)
G is a group (—X—Y—Z) contributed by a comonomer (which does not interfere with liquid crystalline properties of the copolymer; preferably G is an aliphatic or aromatic group which can contain N, S, or nonperoxidic O atoms).

Example 45

Preparation of a poled waveguide cell comprising liquid crystalline fluorinated polymer of the invention Poly-4-[4'-(6''-acryloyloxyhexyloxy)benzoyloxy]-1-(1''',1'''-dihydroperfluorobutyloxy)benzene-co-4-[4'-(6''-acryloyloxyhexyloxy)benzoyloxy]-1-cyanobenzene (from Example 34) was placed in a vacuum oven and kept above its melting transition temperature $T_m$, (140° C.), for eight hours to ensure the polymer was free from bubbles. A sample of the polymeric melt was then spread between two electrically conductive glass plates having an indium-tin oxide (ITO) electrode pattern on them (available from Donnelly Corporation; Holland, Mich.). The polymer was heated above $T_m$ within a heated Carver TM hydraulic press set to 690 kPa (100 psi), which compressed the sample into a thin film with thickness less than 5 micrometers. After 30 minutes, the assembly was cooled to room temperature.

An electrical wire was attached to each of the glass plates using indium solder, and the periphery of the assembly was sealed with Pronto TM epoxy glue (3M, St. Paul, Minn.). The poling cell was placed in an optical microscope hot stage and observed with a Zeiss TM polarizing microscope (Carl Zeiss Inc.; Thornwood, N.Y.). The lead wires were connected to an AC HP 6827A TM voltage amplifier (Hewlett-Packard Inc.; Palo Alto, Calif.), which amplified the AC voltage signal from a Waveteck TM 130 signal generator (Wavetek Instruments; San Diego, Calif.).

The poling cell was first heated to 120° C. to bring the liquid crystal into its isotropic phase. The cell was then cooled slowly at a rate of 1° C./min. while an AC field of 80 volts at 1000 Hertz was applied on the ITO areas. In the areas where the ITO patterns crossed, the mesomorphic side-chain polymer units aligned parallel to the electrical field (homeotropic alignment) and appeared transparent. The areas where no field was applied were randomly oriented and scattered light. When the poling cell was removed from the hot stage, the aligned liquid crystalline polymer remained transparent for more than one year without any degradation. A light-scattering loss of about 3 dB/cm was measured for this cell assembly.

Various modifications and alterations of this invention will become apparent to those skilled in the art without departing from the scope and spirit of this invention, and it should be understood that this invention is not to be unduly limited to the illustrative embodiments set forth herein.

We claim:

1. A monomer having the formula

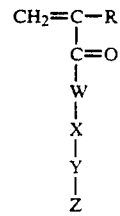

wherein
R is hydrogen, halo, a $C_1$ to $C_4$ alkyl or haloalkyl group, or a $C_6$ to $C_{10}$ aryl group,
W is —O— or —NR$^1$— wherein R$^1$ is hydrogen or a $C_1$ to $C_4$ alkyl group,
X is a carbon-to-carbon single bond or a spacer group,
Y is a mesogenic group, and
Z has the formula —O—CH$_2$—C$_m$F$_{2m+1}$, wherein m is an integer 1 to 12, and wherein said monomer is a liquid crystal.

2. The monomer according to claim 1 wherein X is selected from the group consisting of linear or branched aliphatic and fluoroaliphatic groups having 2 to 20 carbon atoms.

3. The monomer according to claim 2 wherein said aliphatic or fluoroaliphatic groups further comprise at least one of nonperoxidic oxygen and sulfur atoms.

4. The monomer according to claim 2 wherein said aliphatic and fluoroaliphatic groups are substituted by $C_1$ to $C_4$ alkoxy groups.

5. The monomer according to claim 1 wherein Y is selected from the group consisting of

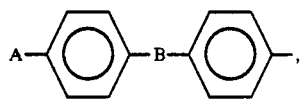

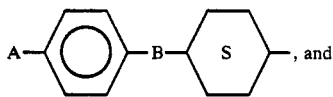, and

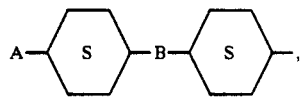, wherein
A is —O—,

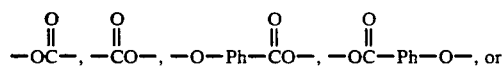

—S—, wherein Ph is 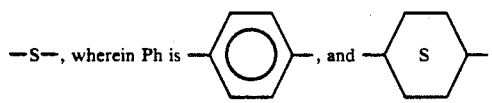

is a saturated ring structure,
B is a carbon-to-carbon covalent bond,

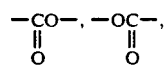

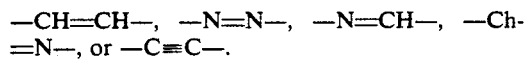

6. The monomer according to claim 1 wherein Z is —OCH$_2$C$_3$F$_7$.

7. The monomer according to claim 1 having the formula

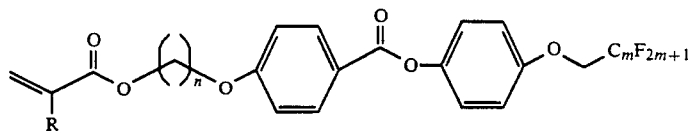

wherein
R is hydrogen, methyl, chloro, fluoro, or trifluoromethyl,
n is an integer 2 to 12, and
m is an integer 1 to 12.

8. The monomer according to claim 7, wherein R is hydrogen or methyl, n is 6, and m is 3.

9. A homopolymer having the formula

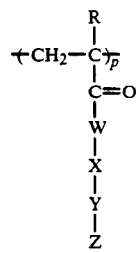 II wherein R, W, X, Y, and Z are as defined in claim 1 and p is an integer having a value in the range of 20 to 600, and wherein said homopolymer is liquid crystalline.

10. The homopolymer according to claim 9 wherein p is in the range of 50 to 300.

11. A copolymer having units of the formula

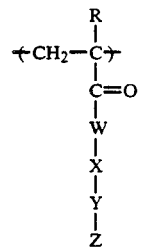 III wherein R, W, X, Y, and Z are as defined in claim 1, and copolymer units derived from any compatible ethylenically-unsaturated monomer by polymerization therewith, the ratio of monomers being in the range of 0.1:99.9 to 99.9:0.1, and wherein said copolymer is liquid crystalline.

12. The copolymer according to claim 11 wherein said monomer is selected from the group consisting of acrylates and methacrylates, styrenes, acrylamides and methacrylamides, vinyl monomers, and allyl monomers.

13. The copolymer according to claim 11 wherein said units of formula III are present in an amount of at least 5 weight percent of the copolymer.

14. The copolymer according to claim 11 wherein said units of formula III are present in an amount of at least 50 weight percent of the copolymer.

15. An optical storage medium comprising the homopolymer according to claim 9.

16. An optical storage medium comprising the copolymer according to claim 11.

17. A guide medium comprising the homopolymer according to claim 9.

18. A guide medium comprising the copolymer according to claim 11.

19. An imaging or display medium comprising the homopolymer according to claim 9.

20. An imaging or display medium comprising the copolymer according to claim 11.

* * * * *

UNITED STATES PATENT AND TRADEMARK OFFICE
CERTIFICATE OF CORRECTION

PATENT NO. : 5,087,672
DATED : February 11, 1992
INVENTOR(S) : Stefan A. Babirad et al.

It is certified that error appears in the above-identified patent and that said Letters Patent is hereby corrected as shown below:

Title Page:
    Under [56] References Cited, "U.S. Patent Documents", add -- 4,867,538   09/1989   Yoon et al.   350/350R --.

Under [56] References Cited, "Foreign Patent Documents" add -- 230898   08/1987 European Patent Office
          188785   07/1986 European Patent Office
          346165   12/1989 European Patent Office
          167777   01/1986 European Patent Office --.

Col. 4, line 1, after "fluorinated" insert -- alkyl or --.

Col. 6, line 28, after "chlorine" add -- . --

Col. 9, lines 8-9, "propanol" should read -- -propanol --.

Col. 11, lines 18-19, "3,5-dimethyl 4 hydroxybenzaldehyde" should read -- 3,5-dimethyl-4-hydroxybenzaldehyde --.

Col. 12, lines 25-26, "4-(omegahydroxyalkyloxy)benzoic" should read -- 4-(omega-hydroxyalkyloxy)benzoic --.

Col. 13, line 1, after "(8"-
    acryloyloxyoxy) benzoyloxy]-1-(1''',1'''-" insert -- dihydroperfluorobutyloxy)benzene, poly-4-[4'- --.

UNITED STATES PATENT AND TRADEMARK OFFICE
CERTIFICATE OF CORRECTION

PATENT NO. : 5,087,672

DATED : February 11, 1992

INVENTOR(S) : Stefan A. Babirad et al.

It is certified that error appears in the above-identified patent and that said Letters Patent is hereby corrected as shown below:

Col. 13, lines 52-54, "poly-4-[4'-(3,'-methacryloyloxypropyloxy)benzoyloxy]-1-(1''',1'''-dihydroperfluorobutyloxy)benzene-co-methyl" should read -- poly-4-[4'-3"-methacryloyloxypropyloxy)benzoyloxy]-1-(1''',1'''-dihydroperfluorobutyloxy)benzene-co-methyl --.

Col. 19, line 65, "(0.3 grams, mmoles)" should read -- (0.3 grams, 2 mmoles) --.

Signed and Sealed this

Twenty-eighth Day of September, 1993

Attest:

BRUCE LEHMAN

Attesting Officer

Commissioner of Patents and Trademarks